E. L. YORK.
IRONING ROLL.
APPLICATION FILED MAY 19, 1920.
1,397,348.
Patented Nov. 15, 1921.
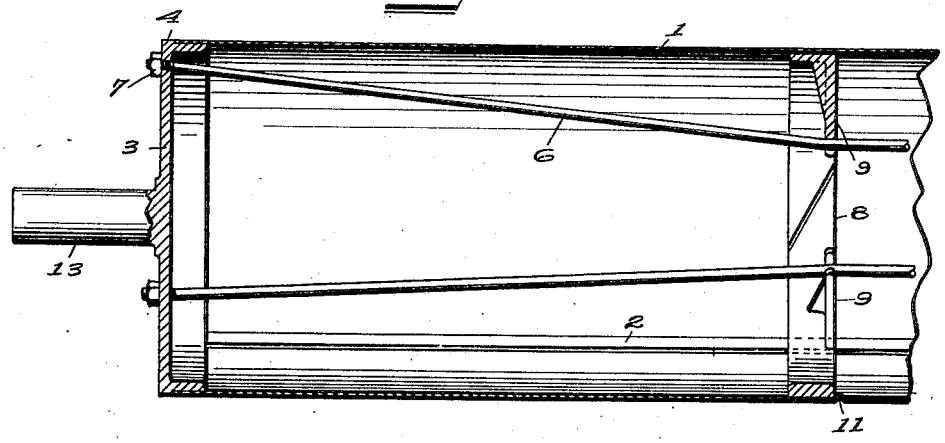
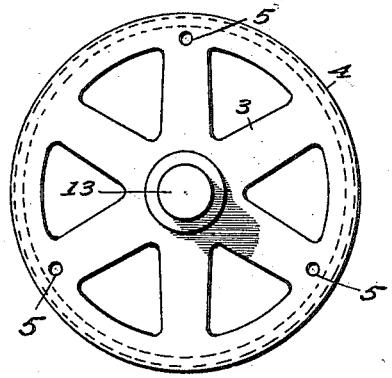 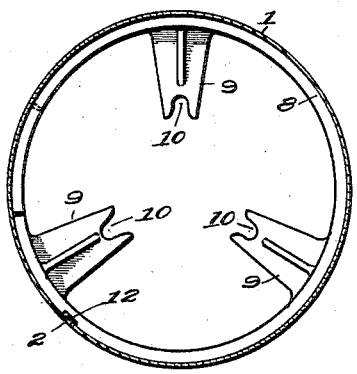
Inventor.
Edgar L. York.
Atty.

UNITED STATES PATENT OFFICE.

EDGAR L. YORK, OF PEORIA, ILLINOIS, ASSIGNOR TO OASIS MANUFACTURING CO., OF PEORIA, ILLINOIS, A CORPORATION.

IRONING-ROLL.

1,397,348.　　　　Specification of Letters Patent.　　Patented Nov. 15, 1921.

Application filed May 19, 1920. Serial No. 382,576.

*To all whom it may concern:*

Be it known that I, EDGAR L. YORK, a citizen of the United States, and a resident of Peoria, in the county of Peoria and State of Illinois, have invented certain new and useful Improvements in Ironing-Rolls, of which the following is a full, clear, and exact description, reference being had to the accompanying drawing, forming part of this specification.

My invention relates more particularly to rolls for use in connection with ironing machines such as those shown and described in my pending application for Letters Patent on ironing machines, one bearing Serial #325,495 and filed on September 22, 1919, the other bearing Serial #374,832 and filing date of April 19, 1920, though the roll is capable of use in connection with other types of machines and for other purposes.

One object of my invention is to provide a roll which is constructed entirely of metal, the construction being such that the roll is exceptionally light in weight, is cheap to produce and is of ample strength to meet all requirements of service.

Another object of my invention is to so arrange and construct the various parts of the roll that it may be easily assembled and its parts easily and cheaply produced.

Other objects of my invention will appear and be described in the specification.

The novelty of my invention will be hereinafter more fully set forth and specifically pointed out in the claims.

In the accompanying drawing Figure 1 is a central sectional side elevation of a portion of a roll embodying my invention.

Fig. 2 is an end view of one of the members of the roll.

Fig. 3 is a sectional end view of the roll, the view being taken at a point between the end of the roll and one of the intermediate rings, the brace rods being omitted.

The same numerals of reference are used to indicate identical parts in all the figures.

In constructing my roll I employ a sheet metal tube 1 which is cylindrically formed and seamed as at 2, the same being thrown to the inside of the cylinder so that the outer surface is smooth. A head or end member 3 is inserted in each end of the cylinder 1, each head being shouldered as at 4, the shoulder forming a limit for the movement of the end member into the end of the cylinder, each member being provided with openings 5 (Fig. 2) through which truss rods 6 pass, these rods extending through the head at one end of the cylinder to the head at the other end, each being provided with a nut 7 at each end thereof.

One or more split rings 8 are placed within the cylinder 1 at points dividing the cylinder into any number of equal divisions, determined by the number of split rings employed, each of these split rings 8 being provided with a plurality of inwardly extending lugs 9, each of the latter being provided with a seat 10 for the reception of the truss rods 6.

If desired, and to assist in preventing the split rings from slipping, the cylinder 1 may be indented as at 11, and the split rings placed against the indentations thus formed, it being apparent that the cylinder may be indented at both sides of the rings 8 to positively hold these rings against slippage in either direction.

To insure that each of the split rings fit snugly within the cylinder, the rings are made slightly larger than the internal diameter of the cylinder 1 so that when placed therein, the rings exert an outward pressure upon the cylinder, this partially being determined by the strength of the ring itself and the amount by which it is larger than the internal diameter of the cylinder 1.

Each of the rings is notched at 12 as shown in Fig. 3, the notch being of a size to embrace the seam 2 of the cylinder 1, the notch serving as a means for preventing the split ring from turning within the cylinder.

Each of the end members 3 is provided with a trunnion 13 which serves as a supporting member for the roll when in position on the machine, these trunions passing through suitable bearings, one of the trunions carrying a gear or other means for rotating the roll though it is of course apparent that the end members may be provided with other means of support and driving without departing from the spirit of my invention.

In assembling a roll constructed in accordance with my present invention I first place the split ring or split rings within the cylinder and adjust their position to divide the roll into the required number of spaces and then insert the end members 3 and press them into place until the shoulder 4 comes against the end of the cylinder 1 after which the truss rods are inserted, each truss rod passing through the proper opening in each end member and being seated in its proper seat in the split ring or split rings as the case may be, whereupon the nuts of the truss rods are tightened and the tension of the rods adjusted to complete the assembling of the roll.

It is to be observed that the inwardly extending lugs 9 of the split rings 8 locate the seats 10 for the truss rods at a point considerably nearer to the axis of the roll than the openings 5 through the end members 3, the result being that the truss rods start from a point comparatively close to the surface of the roll and extend to points comparatively close to the axis of the roll where the rods engage the split rings to the end that the truss rods serve not only as means for bracing the roll at points intermediate its ends but in addition serve as means whereby the roll may be straightened should the cylinder be formed not perfectly straight or should it change its shape after having been made, this straightening being accamplished by subjecting one or more of the truss rods to a greater tension than the remainig rod or rods.

Having thus fully described my invention I claim—

1. In an ironing roll the combination of a cylinder, a ring therein, an end member in each end of the cylinder and truss rods passing through each member relatively near the periphery thereof and having contact with the ring relatively near the center thereof.

2. In an ironing roll a combination of a sheet metal cylinder, a ring inserted therein intermediate the ends thereof, an end member in each end of the cylinder, and a truss rod passing through each end member at a point near the periphery thereof and in contact with the ring at a point a greater distance from the periphery thereof than the point through which the truss rods pass through the end members.

3. In an ironing roll the combination of a sheet metal cylinder and split ring placed therein at a point intermediate the ends thereof, truss rod lugs projecting inwardly from said ring, and end member at each end of the cylinder, and a plurality of truss rods extending from one end member to the other and engaging the lugs of the split ring.

4. In an ironing roll the combination of a seamed sheet metal cylinder with the seam formed inside to project inside thereof, a notched split ring in the cylinder with its notch engaging the seam of the cylinder, truss rod lugs carried by the ring and extending inwardly there from, a shouldered end member at each end of the cylinder and a plurality of truss rods extending from one end member to the other end member and bearing against the lugs of the split ring.

5. In an ironing roll the combination of a sheet metal cylinder an expansible ring within the cylinder and between its ends, and a plurality of angularly arranged truss rods in contact with the expansible ring whereby when the truss rods are subjected to tension the ring will be held in firm contact with the cylinder.

6. In an ironing roll the combination of a seamed sheet metal cylinder with the seam projecting on the inside thereof, a notched expansible ring in the cylinder between its ends with its notch engaging the seam of the cylinder, a plurality of truss rod lugs carried by the ring and extending inwardly therefrom, a shouldered end member in each end of the cylinder and provided with means for locating truss rods relatively near the periphery thereof, and a plurality of truss rods engaging the end members and the expansible ring whereby when the truss rods are subjected to tension the position of the expansible ring may be axially shaped.

EDGAR L. YORK.